United States Patent
Vosper

[11] 3,811,827
[45] May 21, 1974

[54] DIRECT-FIRED HEATING AND COMBUSTION CHAMBER

[75] Inventor: Ralph Richard Vosper, San Jose, Calif.

[73] Assignee: Coen Company, Burlingame, Calif.

[22] Filed: Feb. 5, 1973

[21] Appl. No.: 329,940

[52] U.S. Cl............................... 432/221, 432/222
[51] Int. Cl.............................................. F27b 3/02
[58] Field of Search.................... 432/222, 219, 221

[56] References Cited
UNITED STATES PATENTS
2,495,386    1/1950    Peregrine.......................... 432/222

Primary Examiner—John J. Camby
Attorney, Agent, or Firm—Townsend and Townsend

[57] ABSTRACT

A direct-fired cylindrical chamber having a horizontal floor and a refractory lining is disclosed. Relatively cool air or other gaseous material enters the chamber through ports adjacent the upper portion of the chamber and longitudinal slots of variable width provided between the floor and the sides of the chamber. The air entering through the ports acts to cool the upper portion of the refractory lining, while air passing through the longitudinal slots acts to cool the side portions of the refractory lining. Hence, the air which is to be heated is effectively used to cool the refractory lining to reduce wear thereof.

12 Claims, 3 Drawing Figures

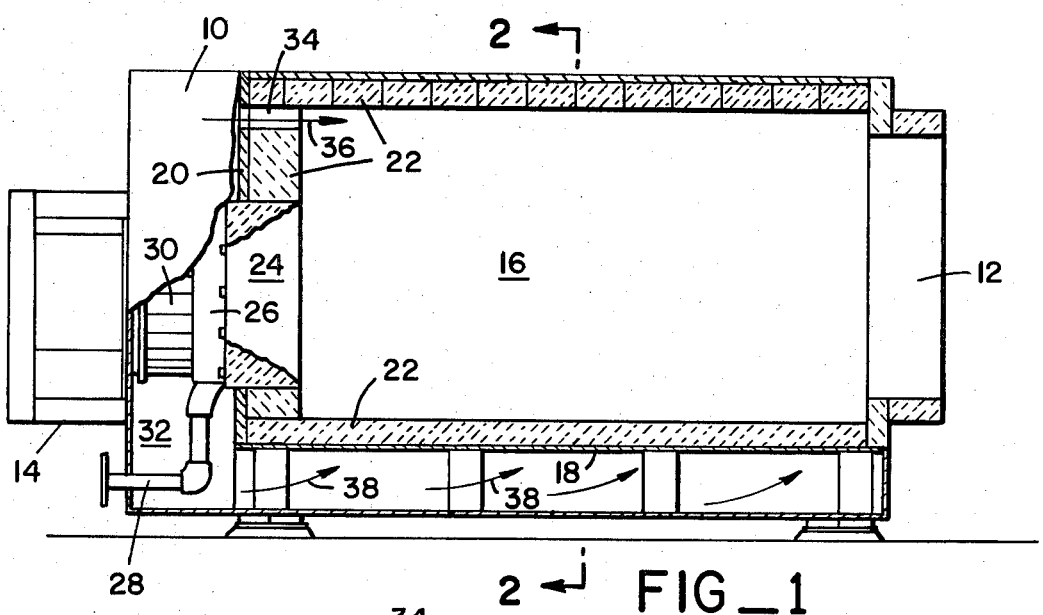
FIG_1
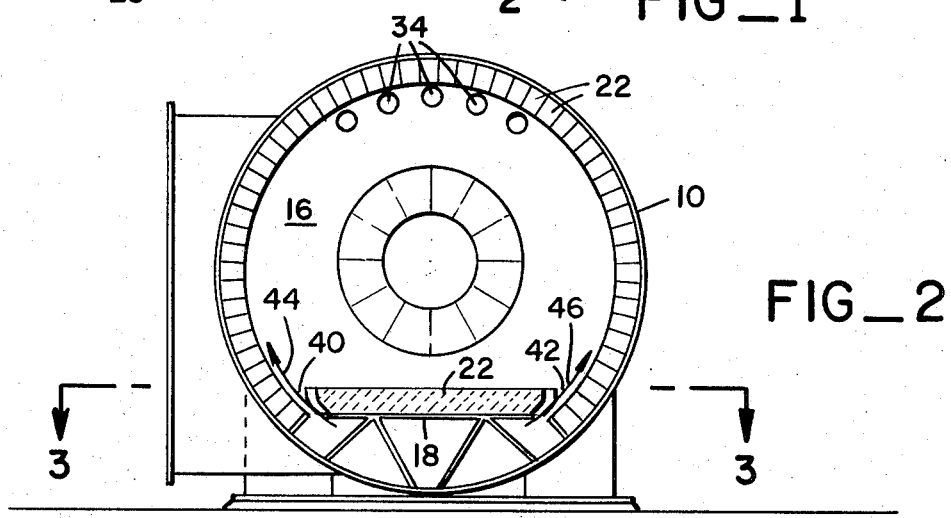
FIG_2
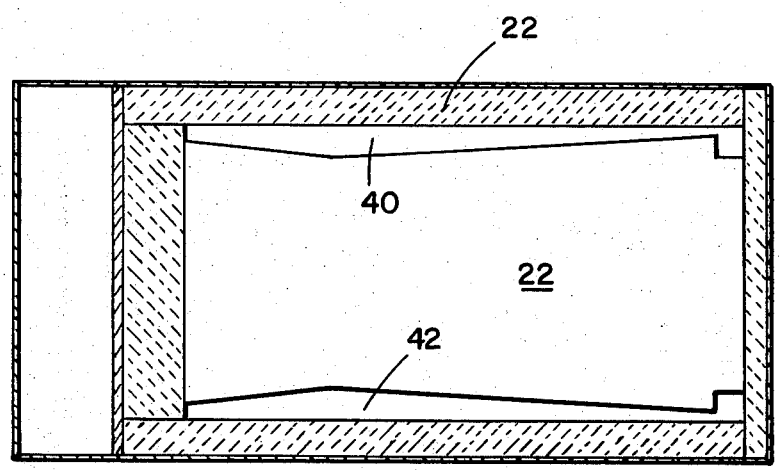
FIG_3

DIRECT-FIRED HEATING AND COMBUSTION CHAMBER

BACKGROUND OF THE INVENTION

1. Field of the Invention

This invention relates to direct-fired chambers, and particularly to apparatus for cooling the refractory lining of such a chamber to reduce wear of the refractory lining.

2. Description of the Prior Art

Heating of air or other gaseous material to extremely high temperatures, such as 1,200° F, is required in several basic industrial applications. Typically, polluted exhaust gases must be heated to this temperature to effectively burn off the pollutants. Also, hot air may be required as a drying agent, such as in the cement industry where hot air is used to dry the raw materials for the manufacture of cement prior to grinding the materials. However, in a device capable of heating air to such temperatures, wear or deterioration of the refractory lining due to the extreme heat is a severe problem.

Various attempts have been made to promote longer life for the refractory lining of an air heater. The most obvious attempt involved merely increasing the thickness of the refractory layer, but this results in an extremely heavy furnace, and requires an extensive amount of refractory material. Another method is to suspend the refractory layer away from the outer shell and pass air through the spaces therebetween. However, this method is difficult to construct, and irregularities in the air passage cause imbalances in the relative cooling of the refractory. Also, the extra space required greatly increases the overall size of the heater. A third attempt involves the use of a standard refractory layer lining a first metal casing, and providing a second metal casing surrounding the first casing so that the air can be passed therethrough. This construction is more simple than the suspended construction but still has the disadvantages of size and irregular cooling.

In the present invention, the air which is to be heated is used to cool the refractory layer. Relatively cool air is fed into a plenum chamber, from which it passes into the heating chamber through entrance-ways adjacent the refractory layer. The air enters the heating chamber either through long-throw ports adjacent the upper surface of the refractory layer so that the air passes along the upper surface to cool the refractory layer, or the air enters the heating chamber through longitudinal slots along the sides of the heating chamber. Air from the slots passes upward along the side walls of the heating chamber to cool the refractory layer in that region. A horizontal floor is used, which is cooled by passage of cool air underneath before passing through the slots into the heating chamber.

The present invention provides apparatus for easily cooling the refractory lining which involves no independent means for cooling the lining. Rather, the cooling function is inherent in the design, and the method of introducing air into the chamber, an essential function, is modified to additionally perform the cooling function. The result is an efficiently designed, compact, lightweight apparatus with long refractory life.

SUMMARY OF THE INVENTION

The invention relates to a refractory-lined heating chamber mounted horizontally. The heating chamber includes a floor extending the length of the heating chamber, and extending laterally to a position proximate the sidewalls of the heating chamber. The floor does not intersect the side walls of the heating chamber, but rather small slots are provided therebetween. The slots have variable width so that more cooling is provided to hotter portions of the chamber. A flame throat is located at one end of the heating chamber and projects a horizontal flame into the heating chamber. A cooling chamber is located below the floor in communication with the slots between the floor and the side walls of the heating chamber. Means are provided for forcing relatively cool air or other gas into the cooling chamber whereby the air passes through the slots between the floor and the side walls of the heating chamber to cool the side walls of the heating chamber.

These and other objects, features, and advantages of the present invention will be more readily apparent from the following detailed description with reference to the accompanying drawings.

BRIEF DESCRIPTION OF THE DRAWINGS

FIG. 1 is a side cutaway view of the preferred embodiment of the invention.

FIG. 2 is a cross-sectional elevation view taken along lines 2—2 of FIG. 1.

FIG. 3 is a top sectional view taken along Lines 3—3 of FIG. 2.

DESCRIPTION OF THE PREFERRED EMBODIMENT

Referring initially to FIG. 1, the features of the present invention are illustrated by reference to the preferred embodiment. A cylindrical housing 10 having an outlet 12 at one end and inlet piping 14 at the other end is provided. Relatively cool air or other gas passes into the interior of the cylindrical enclosure 10 through inlet pipe 14. The invention applies to any gas or fine particle-gas mixture, but the term "air" will be used for simplicity. A heating chamber 16 is formed within the cylindrical enclosure 10, and while the heating chamber 16 includes the outlet 12, it is not in direct communication with the inlet pipe 14.

The heating chamber 16 is bounded by the upper portion of the side walls of the cylindrical enclosure 10, the end of the cylindrical enclosure 10 including the outlet 12, a floor 18, and a vertical wall 20. The floor 18 is preferably horizontal, but may be otherwise shaped to partition the enclosure 10 into upper and lower sections. The entire heating chamber 16 is substantially enclosed by a refractory layer 22. A flame throat 24 is mounted in the vertical wall 20, preferably having a centerline below that of the outlet 12 to account for the natural rise of heated air. The throat 24 projects a flame from burner 26 horizontally into the heating chamber 16. The burner 26 receives gas or other combustible material through pipe 28, and oxidation material through vent 30.

The space within the cylindrical enclosure 10, but outside of the heating chamber 16, is in communication with inlet pipes 14 and defines a plenum chamber 32 for the relatively cool inlet gas. Part of the plenum chamber 32 is comprised of the space below the floor 18 but enclosed by the cylindrical enclosure 10. The floor 18 need not be horizontal, but must provide a space underneath.

Two forms of communication are provided between the plenum chamber 32 and the heating chamber 16 whereby the relatively cool inlet air enters the heating chamber. A plurality of ports 34 extend through the vertical wall 20 at the upper portion thereof, and air flows from the plenum chamber 32 through the ports as indicated by arrow 36. The air which flows through the ports is directed along the upper surface of the refractory layer 22, and serves to insulate the refractory layer from the flame and also to cool the refractory layer. Inlet air also enters the heating chamber 16 from the plenum chamber 32 through longitudinal slots between the floor 18 and the side walls of the enclosure 10, as will be hereinafter illustrated. Entrance of the inlet air to the heating chamber 16 in this manner results in a flow along the underside of the floor 18 as indicated by arrows 38, and the floor is cooled thereby.

The various means for introducing air into the heating chamber 16 are further illustrated by reference to FIG. 2. A plurality of ports 34 are disposed adjacent the upper surface of refractory lining 22. The horizontal floor 18, which extends the length of the heating chamber 16, does not extend all the way to the side walls of the cylindrical enclosure 10. Rather, longitudinal slots 40 and 42 are formed on either side of the horizontal floor 18. Hence, air flows from the space below the horizontal floor 18 through slots 40 and 42, as indicated by arrows 44 and 46 along the side portions of the refractory layer 22. The side portions of the refractory layer 22 are insulated and cooled by the air entering from the longitudinal slots 40 and 42, and the upper portion of the refractory layer is cooled by air from ports 34. Refractory lining 22 covering the floor 18 is not directly cooled since heat will rise and the floor is the least critical heat zone, but is cooled from beneath.

Referring once again to FIG. 1, the flame emanating from flame throat 24 is projected into the interior of the heating chamber 16, so as to provide the most intense heat at a distance somewhat downstream from the flame throat 24. Referring now to FIG. 3, it is apparent that the longitudinal slots 40 and 42 are triangularly shaped to more fully cool the refractory layer 22 in this region. The apex of the triangular shaped slots, or the region where the slots are widest, is disposed at a point intermediate the ends where the heat is the most intense. This is termed a "characterization" of the longitudinal slots to control the relative flow of air along the length of the heating chamber 16 in relation to the cooling required. The high volume of air from the apex of the triangular slots serves to insulate the side walls of the chamber from direct contact of the flame, and to provide a high level of cooling in this area. Relatively less air is provided in other areas where the insulation and cooling requirements are less stringent.

In operation, relatively cool air enters the plenum chamber 32 from inlet pipes 14. From the plenum chamber, the air enters the heating chamber 16 either through ports 34 or longitudinal slots 40 and 42. Air entering through the ports passes along the top of the heating chamber 16 to cool the refractory layer 22 in that region. Air entering through the slots passes up the side walls of the heating chamber to cool that region. The slots are characterized to provide more coolant to hotter areas of the furnace where the flame from throat 24 spreads out to nearly intersect the chamber walls. The relatively cool air in the plenum chamber these areas. acts to cool the vertical wall 20 and the floor 18 to indirectly cool the refractory layer 22 in these areas.

The present invention thus provides a direct-fired heating and combustion chamber in which the air or other gaseous material to be heated as conveniently employed to cool and protect the refractory lining via the ports and slots described hereinbefore, enabling a relatively simple, inexpensive and effective chamber construction.

While a preferred embodiment has been described in detail, modifications and adaptations may occur to those skilled in the art. For example, while slots 40 and 42 have been depicted and described as being triangular, other geometric shapes may be employed to characterize the slots to tailor the cooling air flow to the temperature distribution in the chamber. This and other modifications and adaptations may be made without departing from the spirit and scope of the present invention, as set forth in the claims.

I claim:

1. Apparatus for heating air or other gas comprising:

a refractory-lined heating chamber having a floor spaced laterally from the side walls of the heating chamber to form a longitudinal slot between each lateral edge of the floor and the side walls;
   throat means for projecting a flame into said heating chamber;
   a cooling chamber located below said floor in communication with said slots; and
   means for introducing relatively cool air into the cooling chamber whereby relatively cool air issues from the slots to cool the side walls of said heating chamber.

2. Apparatus as recited in claim 1, wherein the width of the longitudinal slots is variable along the lengths thereof to provide a variable air flow along the length of the heating chamber wherein relatively more air flow is provided to relatively hotter parts of the heating chamber.

3. Apparatus as recited in claim 2, wherein each longitudinal slot has a generally triangular shape with the apex thereof substantially adjacent the hottest part of the heating chamber to provide a larger volume of relatively cool air thereto.

4. Apparatus for heating air or other gas comprising:

a refractory-lined heating chamber mounted horizontally, said heating chamber having a floor extending the length of the heating chamber and laterally extending to a position proximate the side walls of the heating chamber but leaving a small longitudinal slot between each lateral edge of the floor and the side walls of the heating chamber;
   a flame throat at one end of the heating chamber adapted to project a horizontal flame into said heating chamber;
   a cooling chamber located below the floor in communication with said slots between the floor and the side walls of the heating chamber; and
   means for forcing relatively cool air into the cooling chamber whereby relatively cool air passes through the slots between the floor and the side walls of the heating chamber to cool said side walls of said heating chamber.

5. Apparatus as recited in claim 4 and additionally comprising ports located above the flame throat adjacent the upper surface of the heating chamber, and means for forcing relatively cool air through the ports to cool the upper surface of the heating chamber.

6. Apparatus as recited in claim 4 and additionally comprising an outlet for heated air in the wall of the heating chamber opposite the flame throat, said outlet having a center line above the center line of said flame throat.

7. Apparatus for heating or other gas comprising:
a chamber having an outlet at one end thereof;
a floor mounted within the chamber and extending the length thereof, said floor extending laterally proximate the sides of the chamber to divide said chamber into an upper section including said outlet, and a lower section, said floor including longitudinal slots adjacent the chamber walls;
a refractory brick layer substantially lining the upper section;
throat means for introducing a flame into said upper section of said chamber at the other end thereof;
at least one port through the upper portion of said other end of said chamber for the passage of cooling air; and
a plenum chamber in communication with said ports and said lower section to provide cooling air thereto.

8. Apparatus as recited in claim 7, wherein the plenum chamber comprises an enclosed extension of the cylindrical chamber beyond said throat means, said enclosed extension having an inlet for relatively cool air thereto and communicating with said ports and the lower section.

9. Apparatus as recited in claim 7, wherein the longitudinal slots are characterized to control relative flow of air to the upper section along the length of said upper section.

10. Apparatus as recited in claim 7, wherein the floor is horizontal.

11. In a direct-fired air heater having a refractory lined horizontally mounted heating chamber and means for introducing a flame into said heating chamber, the improvement comprising:
a horizontal floor mounted in the heating chamber and spaced from the side walls of said chamber to define longitudinal slots therebetween; and
means for passing relatively cool air through the longitudinal slots and into the heating chamber.

12. An air heater as recited in claim 11, wherein said slots are characterized to control relative flow of air therethrough.

* * * * *